United States Patent [19]

Slezak

[11] 4,061,525

[45] Dec. 6, 1977

[54] TIRE BEAD COVERING APPARATUS

[76] Inventor: Raymond J. Slezak, 558 Princeton Ave., Barberton, Ohio 44203

[21] Appl. No.: 674,689

[22] Filed: Apr. 7, 1976

[51] Int. Cl.² ............................................. B29H 17/22
[52] U.S. Cl. .................................... 156/460; 156/136; 156/422
[58] Field of Search ............... 156/136, 405, 422, 460, 156/405

[56] References Cited

U.S. PATENT DOCUMENTS

| 1,476,807 | 12/1923 | Evans et al. | 156/136 |
|---|---|---|---|
| 1,498,532 | 6/1924 | Ambler | 156/422 |
| 1,591,130 | 7/1926 | Hutchens | 156/136 |
| 1,651,735 | 12/1927 | Shively | 156/136 |
| 1,763,297 | 6/1930 | Fowler | 156/460 |
| 1,871,119 | 8/1932 | Denmire | 156/460 |
| 1,956,982 | 5/1934 | Denmire | 156/136 |
| 3,413,174 | 11/1968 | Porter | 156/405 |
| 3,532,578 | 10/1970 | Chronister | 156/422 |
| 3,876,488 | 4/1975 | Uemura et al. | 156/405 |
| 3,962,020 | 6/1976 | Yonekawa et al. | 156/460 |

Primary Examiner—Charles E. Van Horn
Assistant Examiner—John E. Kittle
Attorney, Agent, or Firm—Hamilton, Renner & Kenner

[57] ABSTRACT

Apparatus for applying an elastomeric cover stock to an annular tire bead including a lower carriage for supporting the tire bead, an upper carriage mounted for movement to clampingly engage the tire bead against the lower carriage, a drive roller for rotationally moving the tire bead, rollers on the upper carriage for adhering the cover stock to the tire bead adjustably positioned with respect to the tire bead and adjustably resiliently biased thereat, and a stock feed and severing mechanism supplying a length of the cover stock sufficient for wrapping about the circumference of the tire bead.

21 Claims, 6 Drawing Figures

TIRE BEAD COVERING APPARATUS

BACKGROUND OF THE INVENTION

The present invention relates to apparatus for covering a tire bead with an elastomeric material prior to its incorporation into a green tire carcass and the subsequent curing thereof. More particularly the present invention relates to apparatus for applying a supply stock of elastomeric material about the entire circumferential extent of tire beads of any of assorted sizes and shapes. More specifically, the invention relates to adjustable apparatus for precisely applying an elastomeric covering to the entire exterior surface of a tire bead made up of a plurality of wire members irrespective of the diameter and cross-sectional configuration and size of the particular bead.

Over the years, there has been a great proliferation in bead configurations and sizes which have been used extensively in the tire industry. Considering only the standard passenger and truck tire configurations which commonly require covered beads, bead diameters of 14 to 25 inches including numerous intermediate increments have become common in the market. In addition, the width of such beads depending upon the diameter, service and other design characteristics may vary from approximately 0.25 to 1 inch. Another variable in bead design characteristics is that the cross-section of the bead may be square, circular, rectangular, hexagonal, or combinations thereof. The problems presented by the above variables are compounded even further by the fact that some beads are wound with bare wire whereas others are elastomer coated and the specifications of the bead covering material in respect to thickness, flexibility, and tackiness vary substantially between one tire manufacturer and another and even between differing tire sizes and designs.

Since these differing tire sizes and other variables have evolved over a period of many years, it is not surprising that bead covering apparatus has often evolved which is essentially capable of handling only a particular type or limited types of bead configurations which were at the time commonly used in the market or which constituted a new design that was not capable of being handled by existing equipment. Thus, many of the existing bead covering machines are extremely limited with respect to the number of variables in bead design which can be altered while still achieving satisfactory operating and fabrication characteristics.

Further, the prior art bead covering machines have employed a number of significantly differing approaches to the application of cover stock about an annular bead configuration. An early approach to the application of bead covering stock contemplated helical wrapping of a continuous strip of cover material progressively about the annular bead configuration. In order to avoid the complexities inherent in passing a supply spool of the covering stock about the annular bead, a later refinement of this approach contemplated the cutting and spaced helical application of a plurality of strips of cover stock in adjacently overlapping configurations. More recently, the trend has been to the use of a cover stock having a width equivalent to the peripheral distance around a cross-section of a particular bead which is cut to the circumferential dimension of the bead and wrapped therearound. In some instances, one edge of the cover stock is applied to the bead with the remaining width being subsequently sequentially directed into adherence with the bead until the opposite edge abuts or overlies the edge initially applied. Another variation of this approach contemplates the initial attachment of the cover stock to the bead at some laterally medial position with progressively displaced portions in one or both directions laterally therefrom being progressively brought into adhering contact with the bead.

Whichever of the approaches to bead application that has been adopted, the prior art bead covering machines known to applicant have remained relatively complex, have experienced difficulty in achieving uniform covering characteristics upon alteration of the bead variables referred to above, and have otherwise demonstrated a lack of flexibility in regard to providing apparatus capable of adequately handling the requisite number of variables in bead size and design.

SUMMARY OF THE INVENTION

Therefore, an object of the present invention is to provide tire bead covering apparatus which overcomes primary limitations of prior art apparatus, particularly with respect to handling variations in bead characteristics. Another object of the invention is to provide apparatus which permits easy insertion of a bead into the apparatus prior to the covering operation and easy removal of a covered bead thereafter. A further object of the present invention is to provide bead covering apparatus which, upon being properly adjusted, has a fully automated operating cycle except for the mere insertion of the uncovered bead and the subsequent removal of a covered bead ready for incorporation in a tire.

Still another object of the invention is to provide bead covering apparatus which is substantially universal in the sense that it is adjustable or adaptable to receive a wide variety of shapes and sizes of bead configurations transcending both passenger and truck tire ranges. A further object of the invention is to provide bead covering apparatus which more particularly will adjustably accept beads having a width of 0.25 to 1 inch and diameters of 14 to 26 inches, inclusive, with any of a variety of cross-sectional configurations including square, circular, rectangular, hexagonal, or combinations thereof. Yet another object of the invention is to provide bead covering apparatus which will operate satisfactorily with rubberized gum or rubberized calendered fabric covering material (the latter of which is generally substantially less compliant) which will operate with respect to extremes of tacky or dry elastomeric bead covering compounds, and which will operate with covered or uncovered wire strands which may or may not have been coated with cement prior to application of the cover stock.

Yet a further object of the invention is to provide bead covering apparatus wherein the supply of cover stock is automatically advanced and positioned for quick transition between beads. Still a further object of the present invention is to provide bead covering apparatus which has an extremely rapid supply stock severing mechanism capable of cutting supply stock moving at a sufficient rate of speed such as to permit coverage and adherence of cover stock to a bead in a matter of a few seconds. Still another object of the present invention is to provide bead covering apparatus which may be mounted on a mobile platform for selective positioning relative to various bead fabricating apparatus such as to provide flexibility in the utilization of the apparatus.

Still another object of the invention is to provide bead covering apparatus which may be relatively easily and quickly adjusted for processing beads of differing sizes or configurations. Yet a further object of the invention is to provide bead covering apparatus which is generally of noncomplex but sturdy construction for purposes of effecting generally trouble-free service with a minimum probability of serious maintenance difficulties. These and other objects, together with the advantages thereof over existing and prior art forms which will become apparent from the following specification, are accomplished by the means hereinafter described and claimed.

In general, tire bead covering apparatus embodying the concepts of the present invention employs a lower carriage for supporting a tire bead, an upper carriage mounted for movement to clampingly engage the tire bead against the lower carriage, a drive roll for rotationally driving the tire bead, rollers on the upper carriage for adhering the cover stock to the tire bead adjustably positioned with respect to the tire bead and resiliently biased thereat, and a stock feed and severing mechanism supplying a length of the cover stock sufficient for circumferential wrapping about the entirety of the tire bead.

DESCRIPTION OF THE PREFERRED EMBODIMENT

Figure 1:
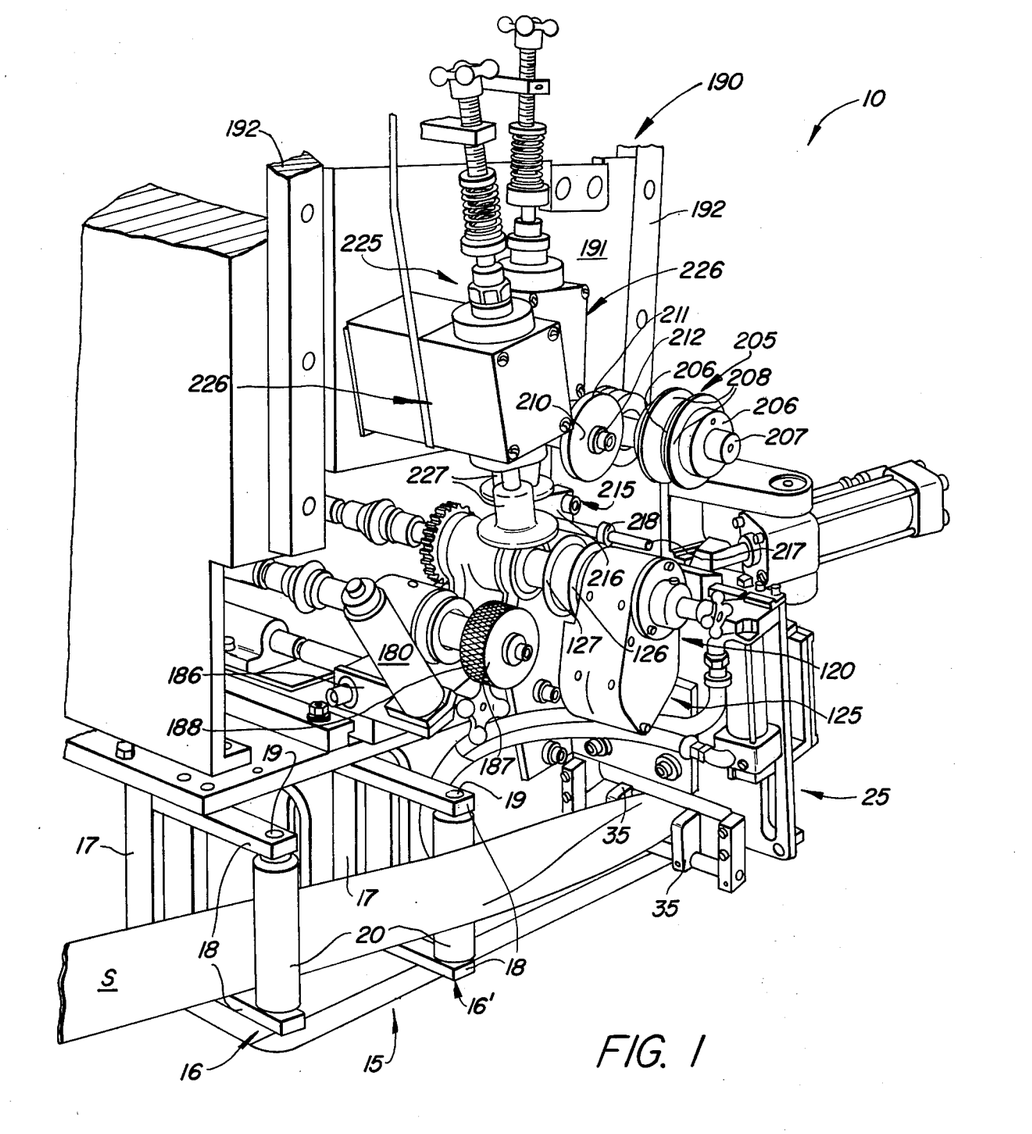
FIG. 1 is an isometric view of the operative portions of tire bead covering apparatus embodying the concepts of the present invention and depicting bead covering material or stock being introduced to the apparatus for application to a previously fabricated bead configuration.
Figure 2:
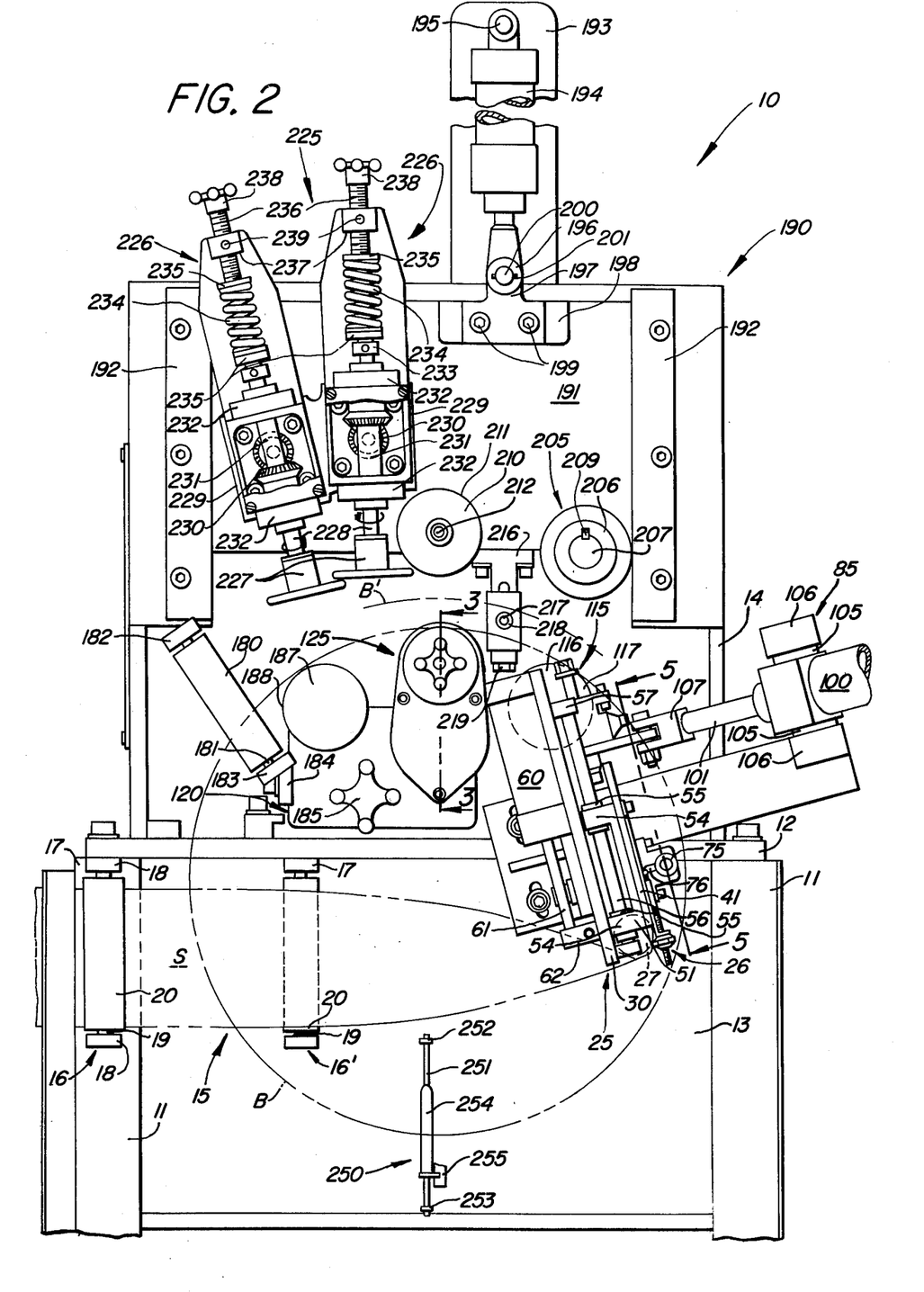
FIG. 2 is a front elevational view of the bead covering apparatus of FIG. 1 depicting an exemplary bead in operative position relative to the lower support carriage and the stock feed and severing mechanism for application of the bead covering material or stock and showing the upper movable carriage in the retracted position displaced from operative engagement with the bead for insertion or removal of a bead from the apparatus.

Referring initially to FIGS. 1 and 2 of the drawings, tire bead covering apparatus according to the concepts of the present invention is indicated generally by the numeral 10. The bead covering apparatus 10 may be mounted on a variety of types of fixed or movable platforms or pedestals which, for example, may include a plurality of vertical posts 11 with a horizontal platform 12 attached thereto (FIG. 2). A lower housing 13 may be attached to the posts 11 and an upper housing 14 may project upwardly from the platform 12, both for purposes of enclosing and/or mounting sundry drive and control elements of the apparatus 10. It is, however, primarily significant that the operative components hereinafter detailed be mounted at a conventional height above floor level for a high degree of operator convenience in achieving rapid insertion of uncovered beads and removal of covered beads, while providing easy access for making the requisite adjustments to adapt the apparatus 10 to beads of differing diameter or cross-sectional configuration or for employing a different width or type of bead covering material.

The bead covering material which shall hereinafter be referred to as supply stock S may be wholly of a rubberized gum or may be a rubberized, calendered fabric. The supply stock S may be introduced to the bead covering apparatus from any of a variety of types of let-off mechanims (not shown) which permits a substantially uniformly tensioned pay-out of material from a roll of supply stock S normally by employing a dancer roll configuration or other similar arrangement. The let-off mechanism normally includes suitable mechanism for providing pay-out of noninsulated stock or stock wherein a separator or insulator is attached to one surface of the stock to prevent adjacent layers of a roll of stock from inner adhering. In this respect it should be recognized that the insulating material for the stock may be in the nature of cloth, polyethylene or a similar material. Further, consideration must be given to the stretching characteristics of the insulated stock such that suitable compensation is made to equalize the take-up and pay-out forces effected by the hereinafter described operational sequence.

The supply stock S in its tensioned condition is introduced to the bead covering apparatus 10 from the aforementioned let-off apparatus in either a horizontal or vertical orientation as seen in the extreme left-hand portions of FIGS. 1 and 2. The introduction of the supply stock S to the bead covering apparatus 10 is via a stock alignment mechanism, generally indicated by the numeral 15. The stock alignment mechanism 15 includes a pair of preferably substantially identical roll assemblies 16 and 16'. The roll assemblies 16, 16' have mounting brackets 17 each of which includes spaced parallel arms 18 between which a shaft 19 is supported. Each of the shafts 19 for roll assemblies 16, 16' carry a bearing-mounted roller 20 which may preferably have a substantially smooth surface for affording essentially nonabrasive guidance to the supply stock S.

The roller 20, although being preferably substantially vertically aligned, are laterally displaced in that the roller 20 of roll assembly 16' is displaced laterally outwardly of roller 20 of roll assembly, 16, i.e., in the direction of the viewer as seen in FIGS. 1 and 2. References hereinafter to outwardly and inwardly shall similarly carry the same and the opposite connotation, respectively. The roller 20 of roll assembly 16 is positioned in such a manner that its tangentially innermost reach deflects the supply stock S passing inwardly thereof a sufficient distance to pass inwardly of a bead operatively positioned in the machine, as indicated at B in FIG. 2. The roller 20 of roll assembly 16' is positioned somewhat outwardly of the roller 20 of roll assembly 16 such that its tangentially outermost reach over which the supply stock S passes lies substantially in coplanar relationship with a bead B positioned in the bead covering apparatus 10. The exact position of roll assemblies 16 and 16' may be varied as to the amount of lateral offset, longitudinal spacing in the direction of travel of supply stock S, and the diameter of rollers 20 such that noninterference between supply stock S and the widest configuration of bead B is assured. It can thus be seen that the stock alignment mechanism 15 diverts the incoming supply stock S to a vertical orientation displaced from the plane of the bead B outwardly to a position in the plane of the bead B and located within the circumference of any diameter bead B which might be positioned on the bead covering apparatus 10.

Figure 5:
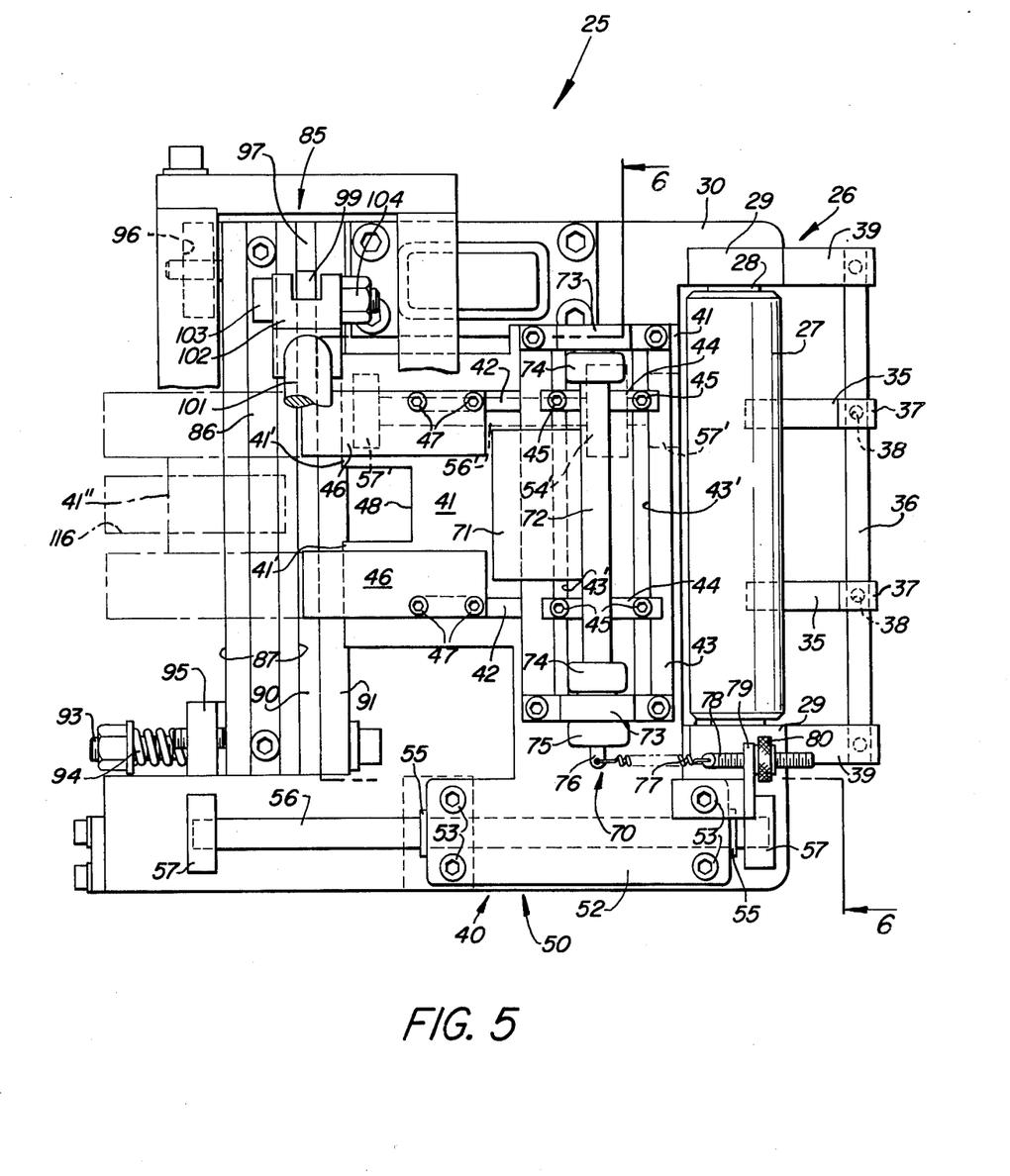
FIG. 5 is a plan view of the stock feed and severing mechanism as viewed substantially along the line 5—5 of FIG. 2.
Figure 6:
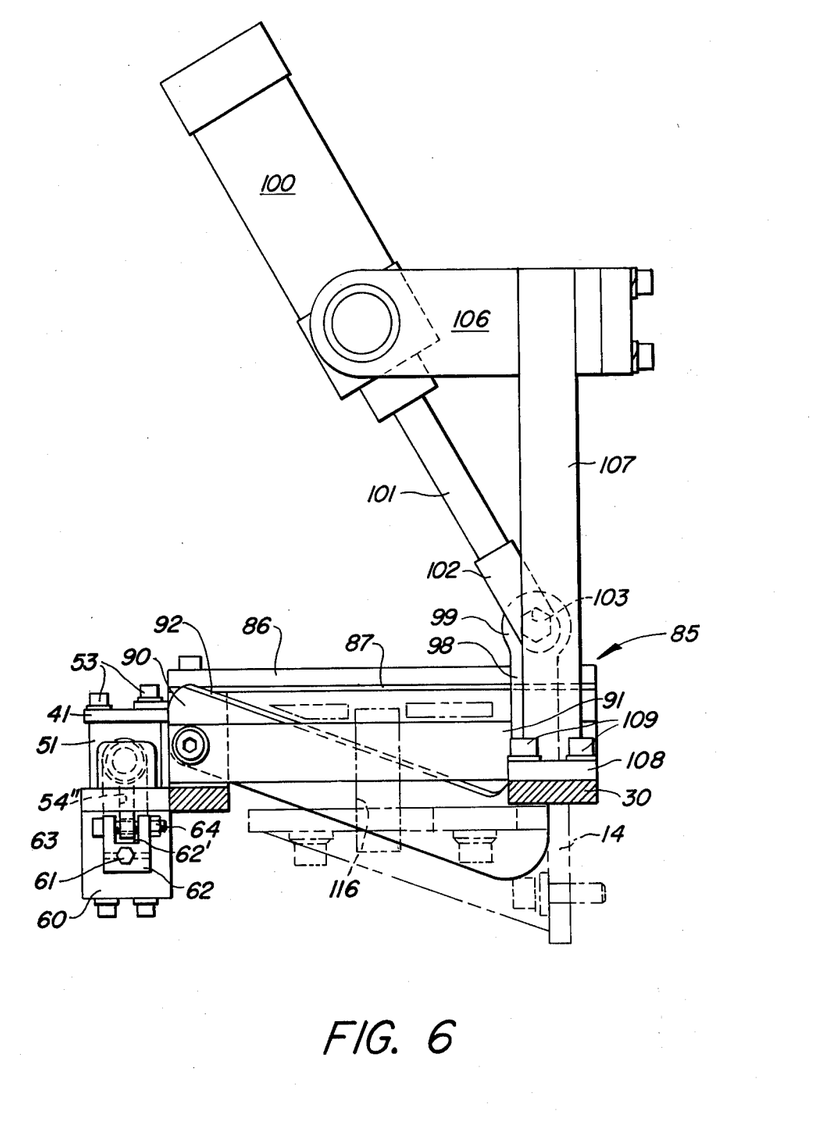
FIG. 6 is a section view taken substantially along the line 6—6 of FIG. 5 and depicting particularly the cutting knife and actuating cylinder portion of the stock feed and severing mechanism.

From the stock alignment mechanism 15 the supply stock S is directed to the right in FIGS. 1 and 2 to a stock feed and severing mechanism, generally indicated by the numeral 25, which effects preliminary and fine alignment of the supply stock S relative to the center line of a bead B, effects controlled advance thereof to a position in engagement with the bead B and effects severing of the supply stock S when a length sufficient to cover the circumference of a particular bead has been extended. As seen in FIGS. 2, 5 and 6, the supply stock S is directed from the roller 20 of roll assembly 16' to a preliminary alignment assembly, generally indicated by the numeral 26, of the stock feed and severing mechanism 25. The preliminary alignment assembly 26 includes a bearing mounted roller 27 freely rotatably mounted on a shaft 28 which is positioned in mounting blocks 29 at either extremity thereof. The mounting blocks 29 are attached to a base plate 30 of the stock feed and severing mechanism 25. The roller 27 is mounted with its longitudinal axis substantially horizontally disposed such that the supply stock S in its travel from roll assembly 16' to roller 27 is reoriented through approximately 90°.

The preliminary alignment assembly 26 also includes a pair of alignment fingers 35, as best seen in FIGS. 1 and 5, which are operationally spaced a distance approximately equalling the width of a particular supply stock S being employed and displaced approximately equidistant with respect to the center line of a bead B appropriately centered in the bead covering apparatus 10. As seen in FIG. 5, the alignment fingers 35 are adjustable laterally of the roller 27 along a shaft 36 which substantially parallels roller 27. The fingers 35 have a boss portion 37 disposed about the shaft 36 with set screws 38 disposed therein for purposes of selectively locking the fingers 35 at any desired position along shaft 36. The axial extremities of shaft 36 are retained in brackets 39 attached to base plate 30.

The reoriented supply stock S as discharged from the roller 27 of the preliminary alignment assembly 26 of stock feed and severing mechanism 25 is operatively positioned in relation to a feed mechanism, generally indicated by the numeral 40. The feed mechanism 40 is, as hereinafter detailed, an intermittently operative shuttle-type system. As best seen in FIGS. 2 and 5 the feed mechanism 40 has a slide plate 41 onto which supply stock S is deposited upon tangential departure from the roller 27 (see FIG. 2). The supply stock S is laterally positioned in the feed mechanism 40 by two guide bars 42, the position of which is selectively laterally variable by means of a guide bar adjustment plate 43 having two spaced laterally extending and substantially parallel slots 43'. The guide bars 42 are positioned relative to the guide bar adjustment plate 43 by clamp bars 44 having cap screws 45 which extend through the clamp bars 44, through the slots 43', and into the guide bars 42 to maintain guide bars 42 positioned relative to guide bar adjustment plate 43. The supply stock S is thus laterally restrained between guide bars 42 and passes beneath the guide bar adjusting plate 43 on the slide plate 41. Once thus threaded, the supply stock S may be pulled through the feed mechanism to a position proximate lead edges 41' of slide plate 41. The guide bars 42 each carry spring fingers 46 attached at the lead end thereof as by cap screws 47. The spring fingers 46 extend outwardly from the lead edges 41' of slide plate 41 for purposes of maintaining supply stock S disposed therebetween in loose engagement with the slide plate 41. The central portion of slide plate 41 in the area intermediate spring fingers 46 has a cutout 48 for a purpose to be hereinafter detailed.

For purposes of selectively advancing the supply stock S from right to left as viewed in FIG. 5, the slide plate 41 selectively shuttles from the solid line position depicted in FIG. 5 to the phantom line position 41". The selective shuttle motion of slide plate 41 is effected by a slide plate drive, generally indicated by the numeral 50. The slide plate drive 50 has a slide carriage 51 seen best in FIG. 2 which is attached to a T-shaped appendage 52 to one side of slide plate 41 by cap screws 53 (FIG. 5). The carriage 51 has spaced projecting legs 54 which are bored to receive bearing inserts 55 which slidably engage a shaft 56 the extremities of which are fixed in shaft mounts 57. The laterally opposite side of slide plate 41 may have a single projecting leg 54' which similarly engages a shaft 56' having its extremities fixed in shaft mounts 57' to stabilized slide plate 41 during its travel. Thus, movement of the carriage 51 from the position depicted in FIG. 5 to a position proximate the left-hand shaft mount 57 effects the movement of slide plate 41 to the phantom line position 41". As seen in FIG. 2, this motion is produced by selective actuation of a cylinder 60. The cylinder 60 has a rod 61 which is attached to a cylinder rod clevis 62 (FIGS. 2 and 6). The cylinder rod clevis 62 is attached to an extension 54" of leg 54 of slide carriage 51 by a cap screw 63 and nut 64 by virtue of the presence of extension 54" in the bifurcated portion 62' of clevis 62. Therefore, actuation of cylinder 60 moves carriage 51 and the attached slide plate 41 between the positions depicted in FIG. 5.

In order to insure that the supply stock S advances with the slide plate 41 to the position 41", the stock feed and severing mechanism 25 is provided with a stock hold-down mechanism, generally indicated by the numeral 70. As best seen in FIG. 5 the stock hold-down mechanism 70 includes a plate-like pawl 71 which overlies a laterally medial portion of the slide plate 41 between roller 27 and spring fingers 46. The pawl 71 is rigidly attached to a shaft 72 which is supported in bearing blocks 73 attached proximate the extremities thereof. The shaft 72 is axially restricted within the bearing blocks 73 by collars 74 which are fixed to shaft 72 at a position axially inwardly of and proximate to the bearing blocks 73. A collar 75 is nonrotatably attached to shaft 72 preferably outwardly of one of the bearing blocks 73. The collar 75 has a radially extending lug 76 (see FIGS. 2 and 5) to which a tension spring 77 is attached. The spring 77 is selectively adjustably tensioned by virture of the fact that the end opposite the lug 76 is attached to a take-up screw 78 which projects through a stanchion 79 attached to base plate 30 for mating engagement with a thumb nut 80. Thus, the tension in spring 77 may be adjusted by displacement of thumb nut 80 along the take-up screw 78 to thus impart via the lug 76 of collar 76 a rotational bias to the shaft 72 which effects selective hold-down pressure by the pawl 71 on supply stock S interposed between it and the plate 41. It is normally advantageous that the pawl hold-down pressure be just sufficient to insure the advance of supply stock S with the plate 41, thereby overcoming the tensioned let-out of supply stock S, but not of sufficient magnitude to cause withdrawal of the supply stock S upon return of the slide plate 41 from the position 41" to the solid line position of FIG. 5.

For purposes of intermittently severing the supply stock S when a sufficient length has been advanced in a manner hereinafter described, the stock feed and severing mechanism 25 has a cutting mechanism, generally indicated by the numeral 85. The cutting mechanism 85 is disposed on the base plate 30 displaced from the slide plate 41 in the direction of travel of the supply stock S. As seen in FIGS. 2, 5 and 6, the cutting mechanism 85 has a shear bar 86 having preferably oppositely disposed cutting edges 87 such that it may be reversed to provide an alternate cutting edge. The cutting edge 87 of shear bar 86 disposed in the direction of pawl 71 is positioned to cooperatively engage a pivoting knife 90 which is preferably provided with a back-up bar 91 which assures that the advance of knife 90 is such that its edge 92 (see FIG. 6) is brought into close cutting engagement with the cutting edge 87 of shear bar 86. It is significant to note that when the knife 90 is in the normal position before or during travel of the supply stock S for application to a bead B, the supply stock S passes freely between the shear bar 86 and the back-up bar 91 and the knife 90 which is at such time disposed as depicted in FIG. 6. Since the supply stock S may be advancing quite rapidly during application to the bead and could tend to deflect the knife 90 when it is brought into engagement therewith for cutting, it is significant that any such deflecting influence would tend to bring the knife edge 92 more positively in contact with cutting edge 87 of shear bar 86 to thus insure effective cutting action.

The pivotal motion of the knife 90 from the normal position depicted in FIG. 6 to the cutting position where the knife edge 92 is aligned with the cutting edge 87 of the shear bar 86 is effected by a pivot bolt 93 extending through the shear bar 86, knife 90 and back-up bar 91. The pivot bolt 93 may have a compression spring 94 to insure that the back-up bar 91 and knife 90 are resiliently but nonlockingly biased with respect to the cutting edge 87 of shear bar 86.

These components of cutting mechanism 85 are affixed relative to the other components of the stock feed and severing mechanism 25 by the pivot bolt 93 which passes through a knife mounting block 95. The extremities of shear bar 86, knife 90 and back-up bar 91 opposite the pivot bolt 93 are similarly secured to a mounting block 96 except that a spacer 97 is interposed between the shear bar 86 and back-up bar 91 to effect a separation sufficient for the pivotal insertion and removal of the knife 90 without binding.

For purposes of effecting the cutting action, and permitting a significant knife opening angle, as by movement to the position depicted in FIG. 6, the extremity of knife 90 opposite pivot bolt 93 has an arcuately extending arm 98 which terminates in what may be an enlarged bored boss 99. The actuation of the knife 90 about pivot pin 93 is effected by a cylinder 100 having a rod 101 mounting a clevis 102 which is attached to the bored boss 99 of extending arm 98 by a cap screw 103 and nut 104. In order to assure the requisite smooth, rapid and effective cutting action required with respect to the moving supply stock S, the cylinder 100 must be precisely and preferably to an extent movably mounted such that its piston rod 101 will impart motion substantially in the direction of travel of boss 99 when knife 90 and its extending arm 98 pivot about pivot bolt 93 which is necessarily a low curvature arcuate segment. These requisites are effected by pivotally mounting cylinder 100 in bushings 105 held in a U-shaped bracket 106 which is attached to a projecting cylinder mounting arm 107. The arm 107 extends outwardly of the shear bar 86 a substantial distance and may be rigidly attached to the base plate 30 by a flange 108 and cap screws 109 (see FIG. 6). In addition, it is necessary that the cylinder 100 in order to smoothly sever the supply stock S while in motion must be relatively fast-acting in at least one direction of piston travel, i.e., during the cutting stroke when the piston rod 101 is retracted into the casing of cylinder 100.

The bead B is supported, rotationally driven and has the supply stock S initially adhered thereto by a bead drive assembly, generally indicated by the numeral 115. The bead drive assembly 115 consists of a drive roller 116 as seen in FIGS. 2, 5 and 6, which preferably has a knurled surface 117 to insure positive frictional engagement with both the supply stock S and the bead B which are initially joined on the surface thereof. As previously indicated, the central portion of slide plate 41 in the area intermediate spring fingers 46 has the cutout 48 which is for the purpose of straddling a portion of the drive roller 116 without interference therewith. The advance of slide plate 41 carrying supply stock S as seen in FIG. 5 is such that the supply stock S is positioned in contact with the drive roller 116. This engagement is insured by the spring fingers 46 which maintain the supply stock S deflected downwardly against the extremity of slide plate 41 such that application of supply stock S to the drive roller 116 is achieved each time the supply stock S is advanced to commence the covering of a new bead B. After the supply stock S is applied to the knurled surface 117 of drive roller 116 the driving of this roller, which may be immediately instituted, necessarily results in the application of the supply stock S to the radially inner surface of the bead B which is also rotated counterclockwise thereby, all as may be readily seen in FIG. 2. Since the drive roller 116 is axially fixed, thereby permitting no inward or outward adjustment thereof, both the supply stock S and the bead B must be brought into engagement with the drive roller 116 in such a manner that the center line of the supply stock S coincides with the axial center line of the bead B. As has already been indicated, the fingers 35 and the guide bars 42 must be accurately positioned not only to accommodate the width of the supply stock S but also to assure alignment of the lateral center line of the supply stock S with respect to the center line of drive roller 116. The alignment of the axial center line of the bead B with respect to the center line of the drive roller 116 is hereinafter described in detail.

The bead B upon departure from the bead drive assembly 115 with the adhered and aligned supply stock S progresses in a counterclockwise arcuate path as powered by the drive roller 116. Subsequent support, positioning and operative steps taken with respect to the combined bead B and supply stock S are effected by elements carried by a lower support carriage, generally indicated by the numeral 120. The lower support carriage 120 carries a stock fold assembly, generally indicated by the numeral 125, seen in FIGS. 1 and 2 positioned as the uppermost supporting element of the bead B. The bead B is introduced to the stock fold assembly 125 with the supply stock S in essentially a planar configuration adhered only at a point substantially laterally medially thereof and centered about the lateral center line of the bead B. As is depicted for exemplary purposes in FIG. 3, the stock fold assembly 125 effects the folding of the supply stock S about the axial sides of the bead B such that upon passing through the assembly the remaining unadhered portions of supply stock S extend substantially vertically from the lateral extremities of the bead B. The stock fold assembly 125 has an outer fold roller 126 and an inner fold roller 127 in opposed relation which respectively engage the inner and outer axial sides of the bead B (see FIGS. 1, 3 and 4). In order to accomplish the purpose of the bead covering apparatus 10 of universally handling beads or differing sizes and a vast range of cross-sectional configurations, it is necessary that the distance between outer fold roller 126 and inner fold roller 127 be selectively adjustable and that a spindle 128 be interposed therebetween at all times for purposes of effecting the aforementioned support function for the bead B. In order for the rollers 126, 127 to smoothly accommodate and upfold the lateral extremities of supply stock S, they must be rotated at approximately the speed of the bead B as imparted by the bead drive assembly 115.

The rollers 126 and 127 are powered from a drive shaft assembly 130 which may be connected in any number of ways which would be appreciated by persons skilled in the art through a suitable gear box (not shown) to a drive motor (not shown). The drive shaft assembly 130 is directly coupled to a shaft 131 of the inner fold roller 127 which is supported by a housing 132 carrying bearings 133 proximate either extremity thereof. The spindle 128 is partially encompassed within a bore 135 in the shaft 131. A compression spring 136 is positioned in the bore 135 inwardly of the spindle 128 such that the spindle 128 is biased into engagement with the face of outer fold roller 126 at substantially the center thereof over the entire range of variable separation between the outer fold roller 126 and the inner fold roller 127.

The outer fold roller 126 is powered and axially positioned relative to the inner fold roller 127 by virtue of the structure hereinafter specified. The shaft 131 carries in fixed rotational relation thereto a pinion 140 which matingly engages a gear 141 mounted on a shaft 142. The shaft 142 is supported preferably by two sets of bearings 143 within a housing 144. The shaft 142 is connected to a universal joint 145 having a driving shaft 146 coupled to shaft 142 and a driven shaft 147.

The driven shaft 147 of the universal joint 145 is telescoped within a pinion shaft 150 and effects rotation thereof by a key 151. The pinion shaft 150 is supported within a housing 152 on bearings 153. Mounted between the spaced bearings 153 a pinion 154 is attached to the pinion shaft 150 by a key 155. The pinion 154 matingly engages a gear 156 which is attached by a key 157 to a gear shaft 158. The gear shaft 158 is supported to either side of the gear 156 by bearings 159 within a portion of housing 152. Gear shaft 158 has a through bore 160 which mounts interiorly thereof and slidably receives a movable shaft 165 therewithin. The movable shaft 165 has a radial bore 166 which slidably retains a friction shoe 167 which is biased radially outwardly against the inner surface of gear shaft 158 by a compression spring 168. The movable shaft 165 mounts the outer fold roller 126. The gear arrangement hereinabove discussed is designed in such a manner that inner fold roller 127 and outer fold roller 126 rotate at the same angular velocity during normal operation. It is to be appreciated, however, that in the event of excessive binding between supply stock S surrounding a bead B passing between the rollers 126, 127, the friction shoe 167 would permit an extent of slippage between the gear shaft 158 and the movable shaft 165 such that a variation between the angular velocity of the rollers 126 and 127 would be effected, thereby tending to preclude any deleterious damage to the supply stock S in event of a bead B or supply stock S irregularity. In instances where it might be desirable or required for machine design or other considerations that the rollers 126 and 127 be of slightly differing radii, the desirability of the aforedescribed slippage between gear shaft 158 and movable shaft 165 would be increased to permit variations in the angular velocity of rollers 126, 127, particularly as the supply stock S would initially engage the periphery of the rollers which would be at differing radial positions.

The variable spacing between outer fold roller 126 and inner fold roller 127 is effected by axial adjustment of movable shaft 165 relative to the gear shaft 158. This movement is selectively effected by an adjustment screw 170 which engages a thrust bearing 171 reposing within the extremity of movable shaft 165. An adjustment knob 172 is attached by a pin 173 to the adjustment screw 170 for convenience in selecting the axial position of the screw 170 and thusly movable shaft 165 carrying outer fold roller 126. The adjustment screw may be partially enclosed within a hub 174 attached to housing 152. The hub 174 may have a set screw 175 which may be brought into locking engagement with the adjustment screw 170 once the appropriate axial position of outer fold roller 126 has been established for a particular bead B so that operational vibrations of the equipment do not inadvertently result in movement of the adjusting screw 170.

Figures 3, 4:
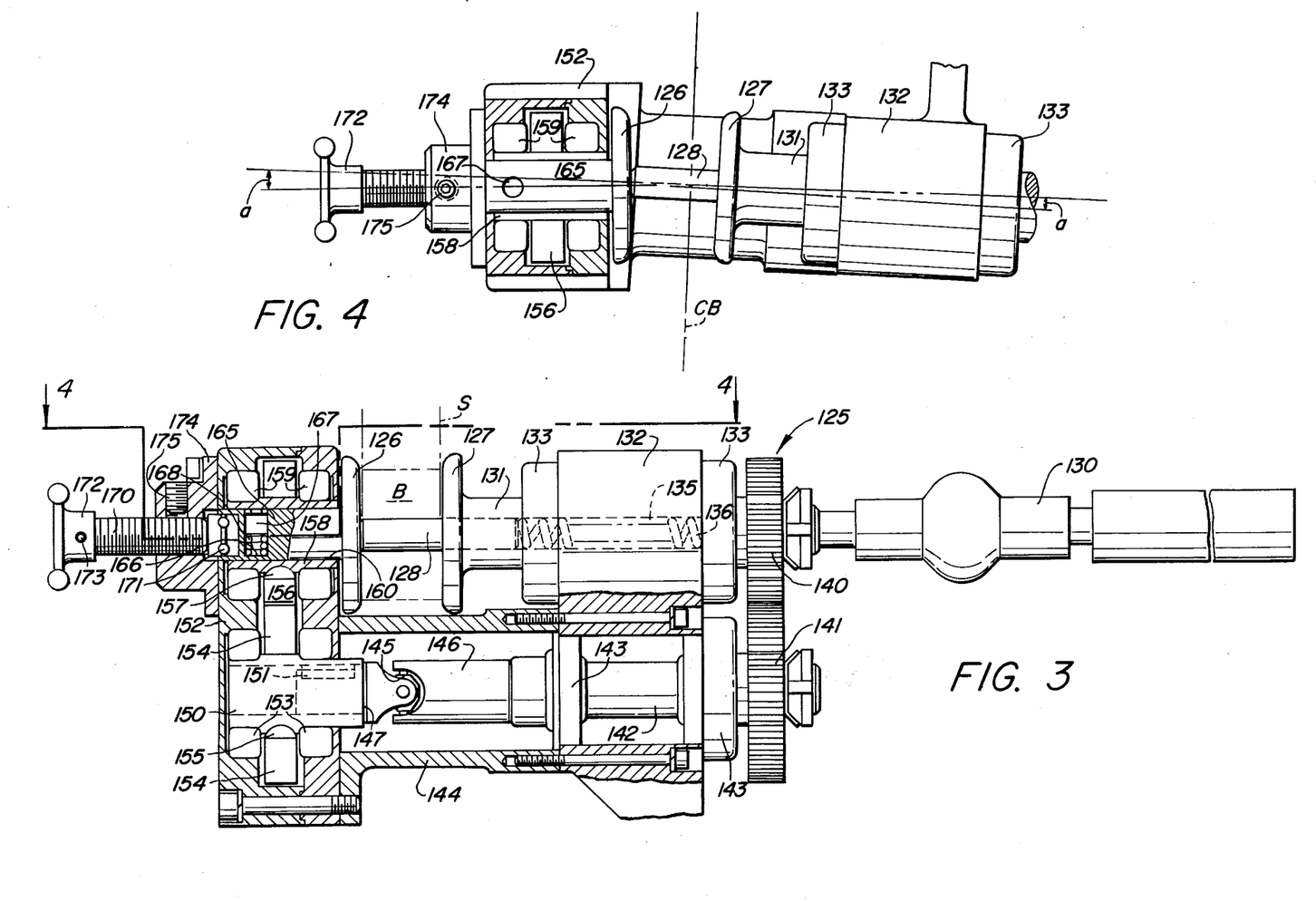
FIG. 3 is a sectional view taken substantially along the line 3—3 of FIG. 2 showing details of the stock fold assembly for adhering stock to the lateral sides of a bead configuration, which mechanism constitutes a portion of the lower support carriage.
FIG. 4 is an enlarged fragmentary view partially in plan and partially in section taken substantially along line 4—4 of FIG. 3 and showing particularly the angular relationship of the rollers of the stock folding mechanism.

It is also significant to note that, as appears from the face of FIG. 4, the center lines of the shafts 165 and 131 carrying the rollers 126, 127, respectively, are each offset with respect to a line perpendicular to the center line of an exemplary bead, designated CB, passing through the stock fold assembly 125 through angles α which are preferably on the order of 2° in the direction of bead approach. Additionally, both rollers 126 and 127 must necessarily rotate counterclockwise as viewed in FIG. 1, and the angular velocity thereof must exceed the angular velocity of drive roller 116. This is necessary to insure that upon introduction of the bead to the stock fold assembly 125 the rollers 126, 127 impart a component of linear velocity substantially equivalent to the velocity of the bead B while imparting a velocity component in a direction generally radially of the bead such as to lay the supply stock S in adhering relation to the axial sides of a bead B. The offset shown in FIG. 4 provides an arrangement wherein the supply stock S covering the bead B after its application upon introduction between rollers 126 and 127 is not in any substantial engagement with rollers 126 and 127 after passing the spindle 128, since the direction of rotation of that portion of the rollers is in opposition to the counter-clockwise direction of travel of the bead B, and, if in engagement with the supply stock S would tend to peel off the stock just applied.

The lower support carriage 120 also carries an alignment roller 180 which engages the inner axial side of a bead B in the bead covering apparatus 10. The alignment roller 180, as seen in FIGS. 1 and 2, is bearing mounted on a shaft 181 between set collars 182 and 183. The shaft is attached to a mounting plate 184 which is affixed to the lower support carriage 120. Once the leading or right-hand edge of the rollers 126 and 127 of stock fold assembly 125 is adjusted to approximately the width of a particular bead plus twice the thickness of supply stock S, the entire lower support carriage 120 is adjusted inwardly or outwardly by a control knob 185 operating a conventional screw drive 186 until a bead B when centered on drive roller 116 is aigned with rollers 126 and 127 and has the radially inward side thereof in engagement with alignment roller 180.

Interposed between the stock fold assembly 125 and the alignment roller 180 on the lower support carriage 120 is a measuring roll 187. The measuring roll, as best seen in FIG. 1, preferably has a knurled outer surface 188 to insure positive rotation with a bead B traveling thereupon. The measuring roll 187 is preferably positioned in such a manner as to tangentially engage the radially interior surface of a bead B such that the linear travel of the bead B is reflected in nonslipping linear travel of the outer surface of measuring roll 187. The measuring roll is connected in a manner, which would be apparent to persons skilled in the art, to a revolution counter which adjustably actuates the cylinder 100 of the cutting mechanism 85 to sever the supply stock S when a sufficient length of supply stock S has been advanced by drive roller 116 and the bead B to effect total circumferential covering of the bead B.

Cooperating with the aforedescribed elements of the lower support carriage 120 to provide alignment, clamping and other operative functions with respect to a bead B and supply stock S is an upper movable carriage, generally indicated by the numeral 190. As best seen in FIGS. 1 and 2, the upper carriage assembly 190 has a slide plate 191 which is mounted in preferably oppositely disposed parallel track members 192 attached to the upper housing 14. The slide plate 191 is thus vertically movable with respect to the track members 192 and the entire upper housing 14. The upper housing 14 carries an extending mounting block 193 to which a cylinder 194 is attached at one end thereof on a pivot pin 195. The opposite end of the cylinder 194 carries a clevis 196 which is attached to a lug 197 which extends from a mounting block 198 attached to the slide plate 191 as by cap screws 199. The lug 197 is attached to the clevis 196 as by a shaft 200 extending therethrough which may be suitably secured against axial movement by a pin 201.

The slide plate 191 of upper carriage 190 carries an alignment and pressure roller assembly, generally indicated by the numeral 205, as seen in FIGS. 1 and 2. The alignment and pressure roller assembly 205 effects an application of clamping pressure to a bead B reposing on drive roller 116 and maintains a bead B inwardly and outwardly centered such that its center line coincides with the center line of the drive roller 116. As shown the alignment and pressure roller assembly 205 consists of two rolls 206 mounted on a drive shaft 207 projecting from the slide plate 191. For purposes of carrying out the alignment function, each of the rolls 206 may have a projecting flange 208 for maintaining the lateral positioning of a bead B. Each of the rolls 206 is provided with means for selective adjustment axially of the shaft 207, as by a set screw 209. When the slide plate 191 of upper carriage 190 is moved from the up position depicted in FIG. 2 to the lower clamping position, the rolls 206 are initially adjusted axially of the drive shaft 207 such as to thereafter effect the requisite centering, lateral alignment, and pressure engagement of a bead B with respect to the drive roller 116.

The slide plate 191 of upper carriage 190 also carries an upper drive roller 210, the center line of which is aligned in an inward and outward direction in conformance with the center line of the drive roller 116. As can be readily seen in FIGS. 1 and 2, the lowering of slide plate 191 brings upper drive roller 210 in contact medially of a bead B positioned between the fold rollers 126, 127 of stock fold assembly 125. The roller 210 preferably has a knurled outer surface 211 for positive driving engagement with the radially outer surface of a bead B and is mounted on a drive shaft 212.

The drive shafts 207 and 212 of the alignment and pressure roller assembly 205 and upper drive roller 210, respectively, are preferably individually rotationally powered to effect smooth, reliable rotational travel of a bead B. In addition, the tangential velocity at the bead engaging surface of each of rolls 206 and roller 210 is controlled by selecting the angular velocity of the drive shafts 207 and 212 in relation to the radius of the rolls 206 and roller 210 at the bead engaging surface such that the difference in velocity at the radially inner and radially outer surfaces of a bead B of average thickness is compensated for. It should also be noted that rolls 206 and fold rollers 126, 127 constituting one side of each clamping area preferably have a smooth bead engaging surface to permit some extent of bead slippage, if necessary. For these reasons, the rolls 206 and roller 210 accomplish their functions without damaging scrubbing action with respect to the beads which could produce operational irregularities or bead cover damage.

The slide plate 191 of upper movable carriage 190 carries a bead lift and alignment assembly, generally indicated by the numeral 215, which is preferably positioned between the alignment and pressure roll assembly 205 and upper drive roller 210 such as to be interposed between the drive roller 116 and the stock fold assembly 125 when the upper movable carriage 190 is in its lower clamping position. The bead lift and alignment assembly 215 has a mounting block 216 attached to slide plate 191. As seen in FIGS. 1 and 2, a lift finger 217, which may be in the form of a shaft, extends substantially laterally from the mounting block 216. An alignment collar 218 is adjustably axially positioned along the lift finger 217 such that the axially inward edge of a bead B centered on drive roller 116 engages the axially outer surface of alignment collar 218. When the components previously discussed herein are appropriately aligned as indicated for a particular bead width, it is evident that an operator need merely insert a bead B until it reposes against the alignment collar 218 and alignment roller 180 to effect appropriate lateral alignment of the bead with respect to the various elements in engagement therewith.

The lift finger 217 is vertically adjustable relative to its mounting block 216 and slide plate 191 by a thumb nut 219. This vertical adjustment of lift finger 217 is made such that the lift finger 217 underlies the bead B in nonengaging relationship when the slide plate 191 is lowered during the bead covering operation. Once the bead has been covered, the actuation of cylinder 194 to raise slide plate 191 effects a raising of the lift finger 217 such that the bead B reposing thereon is lifted to the position denoted as B' in FIG. 2. With the covered bead being thus cleared from the stock feed and severing mechanism 25, drive roller 116, and stock fold assembly 125, the covered bead B may be easily removed by the machine operator and a new uncovered bead B inserted therein atop lift finger 217 against alignment collar 218 and alignment roll 180 for purposes of effecting a subsequent bead covering operation.

For purposes of folding the extremities of the supply stock S about the radially outer surface of bead B with the lateral extremities of supply stock S in abutting relationship, a bead top rolling assembly, generally indicated by the numeral 225, is carried on the upper movable carriage 190. As seen in FIGS. 1 and 2, the bead top rolling assembly 225 consists of two what may be identical bead roll members 226. Each of the bead roll members has a mushroom roller 227 which is positioned substantially as seen in FIGS. 1 and 2 for purposes of engaging the supply stock S and bringing it into contact with the upper surface of a bead B, preferably shortly subsequent to emergence of a bead B carrying supply stock S from the stock fold assembly 125. As can be seen in FIGS. 1 and 2, the leading mushroom roller 227 rotates clockwise as viewed from the top in FIG. 2 and is positioned such that it has its leading or right-hand edge engaging supply stock S emanating from the axially inner portion of a bead B to wrap the supply stock S across the radially outer surface of a bead B to a position centrally thereof. Conversely, the trailing or left-hand mushroom roller 227 is positioned somewhat outwardly of the leading mushroom roller 227 and rotates in an opposite direction or counterclockwise as viewed from the top in FIG. 2 to similarly wrap the supply stock S emanating from the axially outer portion of a bead B. In a manner similar to the rollers 126 and 127 the mushroom rollers 227 are rotated at an angular velocity such as to impart a component of linear velocity substantially equivalent to the velocity of the bead B at the point of engagement and a velocity component in a direction generally axially of the bead such as to lay the supply stock S in adhering relation to the radially outer surface of a bead B. The mushroom rollers 227 are angularly offset from a plane tangential to bead B such that the leading or right-hand portions as viewed in FIG. 2 engage the bead B while the left-hand or trailing portions are out of engagement such as to preclude a peeling off of the stock as detailed in conjunction with the discussion of rollers 126 and 127, above.

As viewed particularly in FIG. 2 each of the mushroom rollers 227 is attached to a through shaft 228 extending through a gear housing 229 rigidly attached to slide plate 191. Each of the gear housings 229 contain a miter gear assembly 230 having a hollow shaft 231 which is nonrotatably attached as by a spline (not shown) to the through-shafts 228. The miter gear assembly 230 may be conventionally driven from a gear box (not shown) operating other components of the apparatus. Each through-shaft 228 is supported at each end of the gear housing 229 by a suitable seal and bearing arrangement 232. Outwardly of each of the gear housings 229 in the direction opposite the mushroom rollers 227, the through-shafts 228 carry set collars 233 which adjustably control the extent the mushroom rollers 227 extend from the housings 229 to permit compensation for differing bead thicknesses. In order to provide a desirable degree of resilience in the positioning of the mushroom rollers 227, the set collars 233 are backed by compression springs 234 having adapters 235 at either extremity thereof. The upper adapter 235 of each spring 234 carries an adjustment screw 236 which is threaded through a mounting bracket 237 which is affixed to the slide plate 191. Each of the adjusting screws 236 may be provided with a knob 238 to facilitate rotation of adjusting screws 236 to vary the biasing force of springs 234. The mounting brackets 237 may be provided with set screws 239 in order to lock the respective adjusting screws 236 in a desired operating position. Although an extent of experimentation may be required with respect to altering the settings of adjustment screws 236, it is generally found that a tacky supply stock necessitates relatively low spring pressures while relatively dry stock optimumly employs a higher spring pressure.

Since it is significant that a bead B be maintained in a substantially vertical position during the application of supply stock S, a lower bead retainer, generally indicated by the numeral 250, is preferably provided. As shown for exemplary purposes in FIG. 2, the lower head retainer 250 which preferably accommodates varying bead diameters has an inner guide rod 251 attached to lower housing 13 by an upper bracket 252 and lower bracket 253. An outer guide rod 254 of lesser longitudinal extent is mounted on a bracket 255 outwardly of guide rod 251 and spaced therefrom a distance equivalent to the widest bead configuration normally encountered. Alternatively, either the inner guide rod 251 or the outer guide rod 254 could be laterally adjustable dependent upon the width of a particular bead configuration.

What is claimed is:

1. Apparatus for applying an elastomeric cover stock to an annular tire bead comprising, lower carriage means for supporting the tire bead, upper carriage means mounted for movement to clampingly engage the tire bead against said lower carriage means, means for rotationally driving the tire bead, roller means on said upper carriage means for adhering the cover stock to the tire bead adjustably positioned with respect to the tire bead and adjustably resiliently biased thereat, fold roller means having two opposed rollers angularly offset with respect to the tire bead passing therebetween for adhering the cover stock to the lateral extremities of the tire bead, and stock feed and severing means supplying a length of the cover stock sufficient for wrapping about the circumference of the tire bead.

2. Apparatus according to claim 1 wherein said two opposed rollers are selectively adjustably spaced to accommodate tire beads of differing width.

3. Apparatus according to claim 2 including spindle means for supporting the tire bead interposed between said two opposed rollers.

4. Apparatus for applying an elastomeric cover stock to an annular tire bead comprising, lower carriage means for supporting the tire bead, upper carriage means mounted for movement to clampingly engage the tire bead against said lower carriage means, means for rotationally driving the tire bead, roller means on said upper carriage means for adhering the cover stock to the tire bead adjustably positioned with respect to the tire bead and adjustably resiliently biased thereat, fold roller, means having two opposed rollers, one of said fold rollers being slip mounted to permit variation between the angular velocity of said opposed rollers, and stock feed and severing means supplying a length of the cover stock sufficient for wrapping about the circumference of the tire bead.

5. Apparatus according to claim 4 wherein the slip mounted fold roller has a movable shaft within a bore in a driven shaft and a friction shoe biased against the said driven shaft.

6. Apparatus according to claim 5 wherein said fold roller means is mounted on said lower carriage means.

7. Apparatus according to claim 1 wherein said means for rotationally driving the tire bead is a laterally fixed drive roller.

8. Apparatus according to claim 1 wherein said lower carriage means mounts said fold roller means and alignment roller means, said lower carriage means being selectively adjustable axially of said drive roller for aligning said fold roller means and said alignment roller means therewith.

9. Apparatus according to claim 1 including a measuring roll mounted on said lower carriage means and engaging the tire bead to sense the circumferential passage thereof for actuation of said stock feed and severing means to supply a length of the cover stock sufficient for wrapping about the circumference of the tire bead.

10. Apparatus according to claim 1 including lift finger means on said upper carriage means for raising the tire bead from the lower carriage means upon upward movement of the upper carriage means to remove the covered tire bead from the apparatus.

11. Apparatus according to claim 10 wherein a movable set collar on said lift finger is axially adjustable thereof for alignment of an axial surface of the tire bead.

12. Apparatus according to claim 1 wherein said upper carriage means has driven pressure roller means effecting clamping of the tire bead with said lower carriage means upon downward movement of said upper carriage means.

13. Apparatus according to claim 1 wherein said roller means on said upper carriage means are two mushroom rollers laterally offset from the center line of the tire bead to bring the lateral extremities of the cover stock into engagement with the radially outer surface of the tire bead.

14. Apparatus for applying an elastomeric cover stock to an endless tire bead comprising, lower carriage means for supporting the tire bead, drive roller means for rotating the tire bead, upper carriage means mounted for movement to clampingly engage the tire bead against said lower carriage means, roller means on said upper and lower carriage means for adhering said cover stock to the tire bead, feed means having a shuttling slide plate with a cutout which advances to straddle said drive roller means for positioning the medial portion of said cover stock in engagement with said drive roller means for joinder to the radially inner surface of said tire bead during the rotation thereof, and severing means for cutting moving cover stock to a length sufficient for wrapping about the circumference of the tire bead.

15. Apparatus according to claim 14 wherein said feed means has pawl means urging the cover stock into engagement with said slide plate to ensure advance of said cover stock with said slide plate.

16. Apparatus according to claim 15 wherein said feed means has guide bars for aligning the cover stock relative to the tire bead and spring fingers on said guide bars posed proximate the lead edge of said slide plate for maintaining the cover stock in engagement with said slide plate.

17. Apparatus according to claim 16 wherein said feed means has preliminary alignment means including adjustable alignment fingers and an orienting roller for introducing cover stock to said slide plate.

18. Apparatus according to claim 14 further including alignment means positioning the supply stock in the plane of the tire bead and located within the circumference thereof.

19. Apparatus according to claim 18 wherein said alignment means consists of substantially vertically mounted rollers which laterally deflect the cover stock with respect to the vertically oriented tire bead.

20. Apparatus for applying an elastomeric cover stock to an endless tire bead comprising, lower carriage means for supporting the tire bead, means for rotating the tire bead, upper carriage means mounted for movement to clampingly engage the tire bead against said lower carriage means, roller means on said upper and lower carriage means for adhering said cover stock to the tire bead, feed means positioning the medial portion of said cover stock for joinder to the radially inner surface of said tire bead during the rotation thereof, and severing means for cutting moving cover stock to a length sufficient for wrapping about the circumference of the tire bead having a knife and a shear bar positioned in the direction of cover stock travel relative to said knife such that the tendency of the moving cover stock to deflect said knife brings said knife in contact with said shear bar.

21. Apparatus according to claim 20 wherein said knife is pivotally mounted and has back-up bar means resiliently biasing said knife into cutting engagement with said shear bar.

* * * * *